(12) United States Patent
Gratton

(10) Patent No.: US 8,028,414 B2
(45) Date of Patent: Oct. 4, 2011

(54) ENGINE MOUNT BEARING SLEEVE REPAIR

(75) Inventor: Andrew R. Gratton, Fayetteville, AR (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/843,925

(22) Filed: Jul. 27, 2010

(65) Prior Publication Data

US 2010/0288874 A1  Nov. 18, 2010

Related U.S. Application Data

(62) Division of application No. 11/585,055, filed on Oct. 23, 2006, now Pat. No. 7,810,239.

(51) Int. Cl.
*B21D 53/10* (2006.01)

(52) U.S. Cl. ............... 29/898.045; 29/522.1; 29/523

(58) Field of Classification Search ......... 29/898.045, 29/597

See application file for complete search history.

(56) References Cited

U.S. PATENT DOCUMENTS

| | | | |
|---|---|---|---|
| 3,444,606 A | 5/1969 | Jones | |
| 3,639,961 A | 2/1972 | Shiflet | |
| 3,662,462 A | 5/1972 | Shiflet | |
| 4,240,677 A | 12/1980 | Payne et al. | |
| 4,953,777 A | 9/1990 | Griffith | |
| 5,452,504 A | 9/1995 | Tatro | |
| 5,649,417 A | 7/1997 | Hey | |

FOREIGN PATENT DOCUMENTS

| | | |
|---|---|---|
| EP | 0872418 | 10/1998 |
| EP | 1147849 | 10/2001 |
| RU | 2130372 | 5/1995 |
| RU | 2055714 | 3/1996 |

OTHER PUBLICATIONS

Extended European Search Report dated Jan. 30, 2008.

*Primary Examiner* — Richard Chang

(74) *Attorney, Agent, or Firm* — Carlson, Gaskey & Olds, PC

(57) ABSTRACT

Bearing bores for engine mount components must be periodically repaired. A component is disassembled and a bearing is removed from the bearing bore. An inner surface of the bearing bore is machined to remove any damage. A sizing sleeve is selected to have a press fit with the machined inner surface of the bearing bore and with the outer surface of a new bearing. The bearing is press fit into the sizing sleeve and the sizing sleeve is press fit into the bearing bore. The outer surfaces of the sizing sleeve and the bearing are swaged to assist in retaining and preventing relative movement between the bearing, sizing sleeve and engine mount component.

2 Claims, 3 Drawing Sheets

ENGINE MOUNT BEARING SLEEVE REPAIR

RELATED APPLICATION

This application is a divisional of U.S. patent application Ser. No. 11/585,055, which was filed Oct. 23, 2006 now U.S. Pat. No. 7,810,239.

BACKGROUND OF THE INVENTION

The present invention relates generally to a method of repairing an aircraft engine mount and more particularly, to a method of repairing a bearing bore formed in an aircraft engine mount by utilizing a sleeve.

Aircraft utilize engine mounts to retain an engine. Typically, multiple engine mounts are associated with each engine. Several bearings are present in each engine mount, with the bearing pressed into a bearing bore. Forward and aft engine mounts are located between a wing of the aircraft and the engine. The bearings assist in transferring engine thrust to the wing. Aft engine mounts are located between the aircraft housing and the engine and the bearings in those engine mounts assist in transferring vertical movement of the engine to the wing.

Over time the bearings may shift within the bearing bore causing wear or damage to the bearing bore. At periodic intervals over the life of the aircraft the engine mounts are removed and the bearing bores are repaired. The inner diameter of the bearing bore is machined to remove any damage and the used bearing is replaced with a new bearing. Machining the bearing bore creates an oversized inner diameter and specially sized bearings are typically stocked to fit within the machined bearing sleeve. Obtaining and stocking specially sized bearings is costly due to the many variations and types required.

Accordingly, a method of repairing bearing bores in aircraft engine mounts without requiring specially sized bearings is desired.

SUMMARY OF THE INVENTION

The present invention provides an alternate method of repairing a bearing bore formed in an aircraft engine mount.

A plurality of engine mounts support an engine on an aircraft and assist in transferring any movement of the engine relative to the aircraft. Each engine mount includes bearings to connect the engine to the engine mount. One type of mount includes link assemblies. Each of the link assemblies has a bearing at the attachment of the link assembly to a beam assembly and may also have bearings at engine mounting points. Over time the bearings move relative to the link assembly causing wear and damage to the link assemblies. The link assemblies are removed from the engine mount and repaired.

A link arm, including a bearing is disassembled from the beam assembly. The bearing is removed from a bearing bore in the link arm. An inner surface of the bearing bore is machined to remove any damage. Link chamfers are added to the inner surface of the bearing bore at a side first and second side of the link arm.

A sizing sleeve is selected to be of a diameter, such that it will be press fit into the inner surface of the bearing bore. The sizing sleeve has an inner bore that receives an outer surface of a new bearing as a press fit. The bearing is press fit into the sizing sleeve and sizing sleeve is press fit into the bearing bore. When pressed together there are gaps between the link chamfers and the sizing sleeve and the bearing. An outer surface of the sizing sleeve and the bearing is swaged into the link chamfers to retain the components in the link. Swaging the bearing and the sizing sleeve assists in retaining and preventing relative movement between the bearing, sizing sleeve and link arm. The link arm is then reassembled with the link assembly and the engine mount. This same basic repair method can be applied to other engine mount bearings.

To facilitate the swaging, the bearing is formed with a cutout portion at a radially intermediate location to form a radially outer portion to be swaged radially outwardly with the sizing sleeve into the link chamfers in the bearing bore.

These and other features of the present invention can be best understood from the following specification and drawings, the following of which is a brief description.

DETAILED DESCRIPTION OF THE PREFERRED EMBODIMENT

Figure 1:
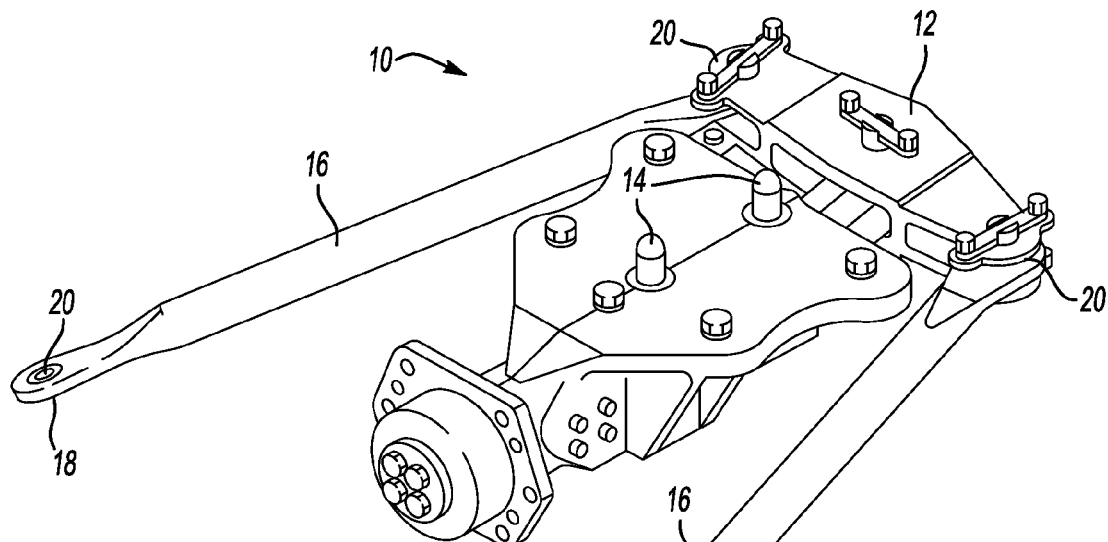
FIG. 1 is a perspective view of an example forward engine mount for an aircraft.

FIG. 1 is a perspective view of an example forward engine mount 10 for an aircraft. The forward engine mount 10 supports the engine on the wing and assists in transferring thrust of the engine to the aircraft. The forward engine mount 10 includes a beam assembly 12 having wing mounting points 14 to connect the forward engine mount 10 to a wing of the aircraft. Link assemblies 16 extend outward from the beam assembly 12. The link assemblies 16 each have engine mounting points 18 to connect the engine to the forward engine mount 10. Each of the link assemblies 16 has a bearing 20 at the attachment of the link assembly 16 to the beam assembly 12. Additionally, bearings 20 may also be located at the engine mounting points 18.

Figure 2:
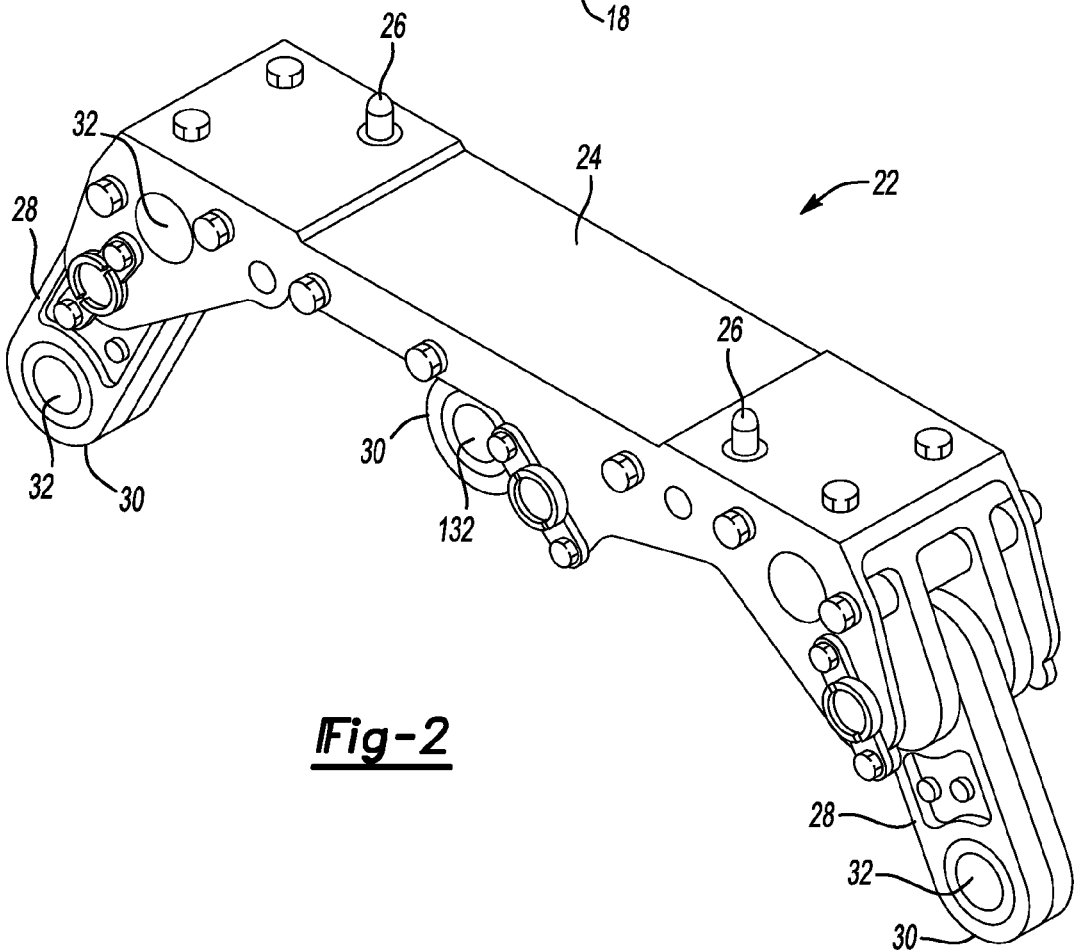
FIG. 2 is a perspective view of an example aft engine mount for the aircraft.

FIG. 2 is a perspective view of an example aft engine mount 22 for an aircraft. The aft engine mount 22 supports the engine on the aircraft housing, specifically the turbine exhaust case, and assists in absorbing vertical movement as a result of the weight of the engine. The aft engine mount 22 includes a beam assembly 24 having aircraft mounting points 26 to connect the aft engine mount 22 to the aircraft. Link assemblies 28 extend outward from the beam assembly 24. The link assemblies 28 each have engine mounting points 30 to connect the engine to the aft engine mount 22. Each of the link assemblies 28 has a bearing 32 at the attachment of the link assembly 28 to the beam assembly 24. Additionally, bearings 32 may also be located at the engine mounting points 30. Note, a bearing 132 is also part of a link. The present invention extends to repair of this location.

Figure 3:
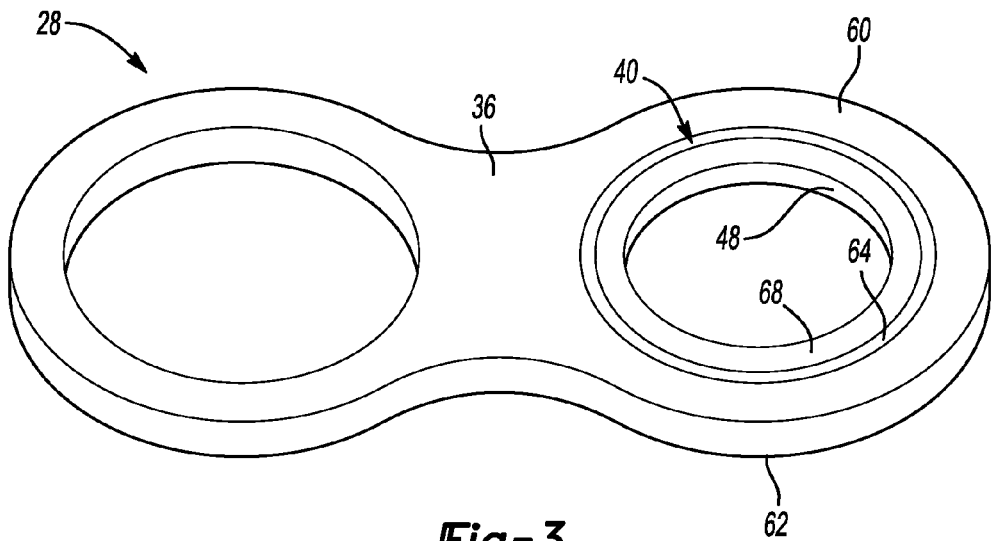
FIG. 3 is a perspective view of an example link arm assembly.
Figure 4:
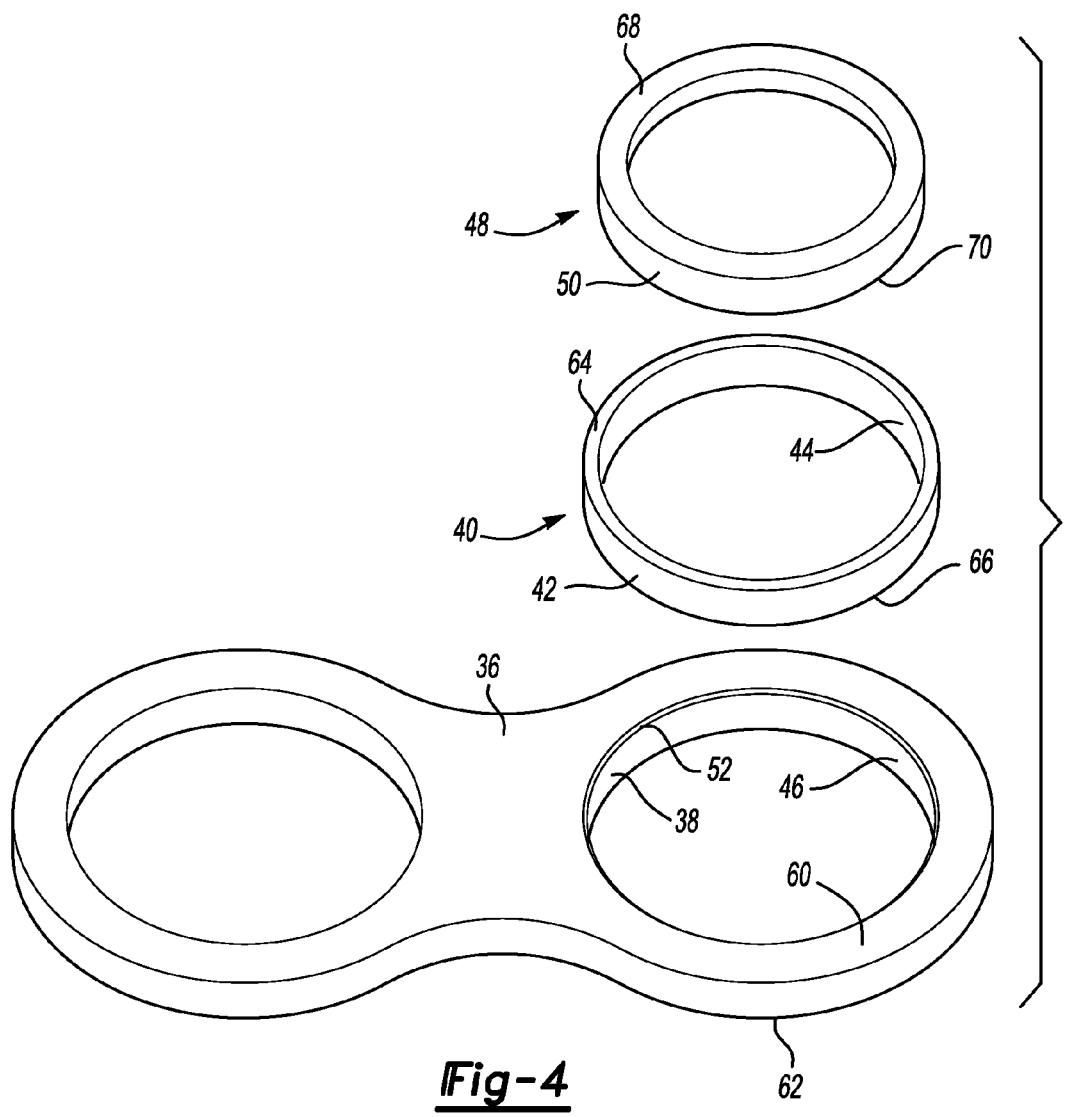
FIG. 4 is an exploded view of the example link arm assembly.

Referring to FIGS. 3 and 4 an example inventive link assembly 28 for the aft engine mount 22 is shown. It should be understood the invention would extend to link assemblies for the forward mount and to bearing 132 also. The link assembly 28 includes a link arm 36. A bearing bore 38 is formed in the link arm 36 and a sizing sleeve 40 is located within the bearing sleeve 38. The sizing sleeve 40 has an annular shape defining an outer surface 42 and an inner surface 44. The sizing sleeve 40 is press fit into the bearing bore 38. That is, the outer surface 42 of the bearing bore 38 has a diameter slightly larger than an inner surface 46 diameter of the bearing bore 38.

A bearing 48 is located within the sizing sleeve 40. The bearing 48 is press fit into the sizing sleeve 40. That is, the diameter of an outer bearing surface 50 is slightly larger than the diameter of the inner surface 44 of the sizing sleeve 40.

The link arm 36 is machined on the inner surface 46 of the bearing bore 38. Link chamfers 52 are added to the inner surface 46 at a first side 60 of the link arm 36 and a second side 62 of the link arm 36. After press fitting, gap 54 (shown in FIG. 5A) remains between the link chamfers 52 and the sizing sleeve 40.

A repair process will now be described. The typical link assembly 28 is removed from the forward engine mount 10 or the aft engine mount 22. The example link assembly 28 includes the original bearing 48 which is removed from the link 36. The original bearing has typically caused wear and damage on the inner surface 46. The inner surface 46 is machined to remove the damage and wear. Chamfers 52 are machined on the inner surface 46. The machined inner surface 46 now has a larger diameter.

A bearing 48 having the same or similar size as the original bearing is selected to replace the original bearing. The bearing 48 is of a standard or stock size that can be easily obtained. A sizing sleeve 40 is selected to have a press fit with the inner surface 46 of the bearing bore 38 and the outer surface 50 of the bearing 48. The bearing is pressed into the sizing sleeve 40. The sizing sleeve 40 and bearing 48 are then pressed into the bearing bore 38. In practice, the press fitting may be achieved by initially shrink fitting the components by placing them in liquid nitrogen, then allowing them to expand back to a press fit.

Figure 5A:
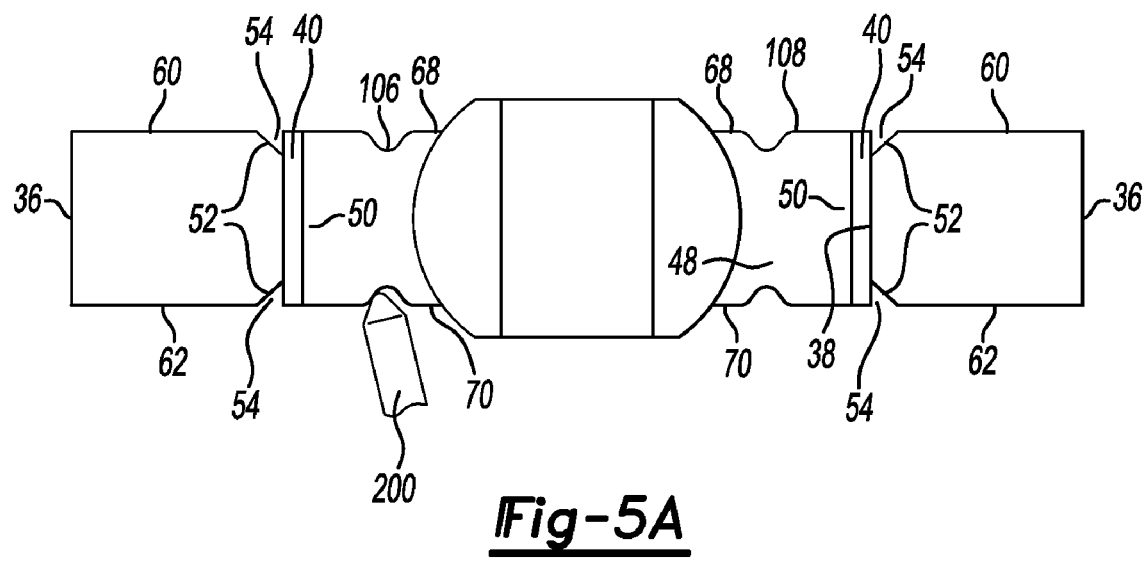
FIG. 5A illustrates the example link assembly prior to swaging.
Figure 5B:
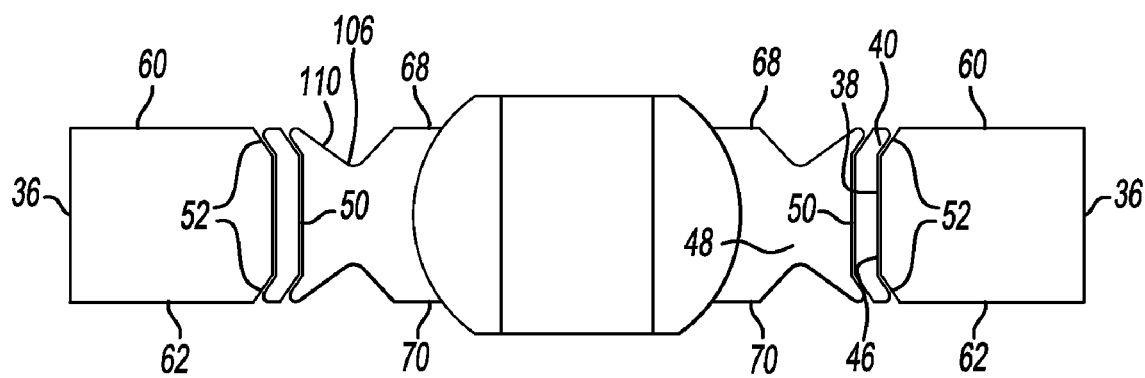
FIG. 5B illustrates the example link assembly after swaging.

FIGS. 5A and 5B illustrate the link assembly 28 prior to and following swaging. Prior to swaging the sizing sleeve 40 and the bearing 48 have been pressed into the bearing sleeve 38. The gap 54 between the link chamfers 52 and the sizing sleeve 40 remains. As can be appreciated from FIG. 5A, the bearing has a cutout portion 106, which defines a radially outer portion 108, which can be seen as being swaged at 110 into the chamfer 52 in FIG. 5B. As is clear, the radially outer portion 108, and the sizing sleeve 40, are swaged radially outwardly into the chamfers 52, and at each axially end. Swaging the bearing 48 and the sizing sleeve 40 assists in retaining the sizing sleeve 40 within the bearing sleeve 38 and the bearing 48 within the sizing sleeve 40. A swaging tool 200 is shown schematically in FIG. 5A. Swaging also assists in preventing relative movement between the bearing 48, sizing sleeve 40 and link arm 36.

While chamfers are shown to create the space to receive the swaged material, other shaped spaces can be utilized.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An engine mount for an aircraft engine comprising:
 a mount portion having an inner bore defining a bearing bore, an inner diameter of said inner bore being machined at a maintenance step to be larger than an initial size;
 a sizing sleeve force fit into said inner bore, said sizing sleeve having an outer diameter that is selected based upon the inner diameter of said inner bore;
 a bearing force fit into an inner bore of said sizing sleeve, said bearing having an outer diameter to be slightly larger than an inner diameter of said inner bore in said sizing sleeve; and
 said bearing and said sizing sleeve being secured to said bearing bore, said bearing having a surface that is swaged with the sizing sleeve into a chamfer on said mount portion, and with said surface being swaged radially outwardly.

2. The engine mount as set forth in claim 1, wherein said bearing is formed with a cutout portion at a radially intermediate location to provide a portion to be swaged into the chamfer on said mount portion.

* * * * *